United States Patent
Wang et al.

(10) Patent No.: US 11,297,602 B2
(45) Date of Patent: Apr. 5, 2022

(54) SERVICE DATA TRANSMISSION METHOD AND APPARATUS

(71) Applicant: HUAWEI TECHNOLOGIES CO., LTD., Guangdong (CN)

(72) Inventors: Hejun Wang, Shenzhen (CN); Mingchao Li, Beijing (CN); Yinghui Yu, Beijing (CN); Zhenzhen Cao, Beijing (CN); Hang Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 71 days.

(21) Appl. No.: 16/783,139

(22) Filed: Feb. 5, 2020

(65) Prior Publication Data
US 2020/0178215 A1    Jun. 4, 2020

Related U.S. Application Data

(63) Continuation of application No. PCT/CN2017/096360, filed on Aug. 8, 2017.

(51) Int. Cl.
*H04L 29/08* (2006.01)
*H04L 12/26* (2006.01)
(Continued)

(52) U.S. Cl.
CPC ........... *H04W 72/02* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

2015/0382336 A1* 12/2015 Zhang ............... H04L 1/0003
 370/329
2016/0057604 A1  2/2016 Luo et al.
(Continued)

FOREIGN PATENT DOCUMENTS

CN    103747432 A    4/2014
CN    104754748 A    7/2015
(Continued)

OTHER PUBLICATIONS

Nokia et al.: "On congestion control for V2Vconmunication",3GPP Draft; R1-1609788,Oct. 1, 2016 (Oct. 1, 2016), XP051159668,total 2 pages.
(Continued)

*Primary Examiner* — Sai Aung
(74) *Attorney, Agent, or Firm* — Womble Bond Dickinson (US) LLP

(57) ABSTRACT

This application provides a service data transmission method and apparatus, and the method includes: obtaining first configuration information, where the first configuration information includes a first service feature parameter and a first resource parameter corresponding to the first service feature parameter; obtaining to-be-sent service data and a second service feature parameter corresponding to the to-be-sent service data; determining, based on the first service feature parameter, the second service feature parameter, and the first resource parameter, a second resource parameter for transmitting the to-be-sent service data; selecting, based on the second resource parameter, an available resource for transmitting the to-be-sent service data; and transmitting the to-be-sent service data by using the available resource. In this way, the service feature parameter of the service data is considered while the available resource is determined, to determine the resource parameter based on the service
(Continued)

feature parameter, thereby better satisfying a delay requirement of a low-delay service.

20 Claims, 2 Drawing Sheets

(51) Int. Cl.
*H04W 72/04* (2009.01)
*H04W 72/02* (2009.01)
*H04L 5/00* (2006.01)
*H04L 43/0852* (2022.01)
*H04W 72/10* (2009.01)

(52) U.S. Cl.
CPC ....... *H04L 43/0852* (2013.01); *H04W 72/048* (2013.01); *H04W 72/0493* (2013.01); *H04W 72/10* (2013.01)

(56) References Cited

U.S. PATENT DOCUMENTS

2016/0309517 A1* 10/2016 Park ................. H04W 56/0005
2016/0323869 A1 11/2016 Xu et al.
2017/0019822 A1 1/2017 Zhao et al.
2017/0019858 A1* 1/2017 Zhao ................. H04W 52/0216
2017/0374664 A1* 12/2017 Kimura ................... H04L 5/001
2018/0139593 A1* 5/2018 Chun ....................... H04W 4/12
2019/0289534 A1* 9/2019 Ryoo ................ H04W 72/0446

FOREIGN PATENT DOCUMENTS

| CN | 104811909 A | 7/2015 |
| CN | 104936164 A | 9/2015 |
| CN | 105682237 A | 6/2016 |
| CN | 106538045 A | 3/2017 |

OTHER PUBLICATIONS

3GPP TS 36.213 V14.3.0 (Jun. 2017),3rd Generation Partnership Project;Technical Specification Group Radio Access Network;Evolved Universal Terrestrial Radio Access (E-UTRA); Physical layer procedures(Release 14),total 460 pages.

* cited by examiner

SERVICE DATA TRANSMISSION METHOD AND APPARATUS

CROSS-REFERENCE TO RELATED APPLICATIONS

This application is a continuation of International Application No. PCT/CN2017/096360, filed on Aug. 8, 2017, the disclosure of which is hereby incorporated by reference in its entirety.

TECHNICAL FIELD

This application relates to communications technologies, and in particular, to a service data transmission method and apparatus.

BACKGROUND

With continuous development of society, vehicles are increasingly popularized. Driving makes people's traveling more convenient, but it poses particular adverse impact on human society. A rapid increase in a quantity of vehicles causes a series of problems such as urban traffic congestion, frequent traffic accidents, and worse environmental quality. Therefore, a sound intelligent transportation system (ITS) is needed from a perspective of a plurality of aspects such as personal safety, traffic efficiency, environmental protection, and economic effects.

Currently, a vehicle may obtain traffic information or receive an information service in time through vehicle to vehicle (V2V) communication, vehicle to infrastructure (V2I) communication, vehicle to pedestrian (V2P) communication, or vehicle to network (V2N) communication. These communication manners may be collectively referred to as "V2X communication", and X represents anything. In addition, communication between vehicles is implemented through forwarding by a network device.

Specifically, currently main air interface transmission technologies in V2X communication-related technologies include sidelink communication and network-forwarded communication. The sidelink communication means that mobile terminals directly communicate with each other and service data is not forwarded by a network device such as a base station, and is mainly communication over a PC5 air interface currently. The network-forwarded communication means that mobile terminals communicate with each other through forwarding by a network device such as a base station, and is mainly communication over an air interface in existing technologies. In the sidelink communication manner, a mobile terminal mainly operates in two operation modes: a mode 3 and a mode 4. The mode 3 means that a terminal device sends a resource request to a network device, and the network device allocates a transmission resource to the terminal device. However, in the mode 4, a terminal does not need to access a network, and autonomously selects a transmission resource.

In the prior art, in a scenario of a mode 4 transmission resource selection solution, when a terminal needs to send service data, a higher layer requests a sending resource from a physical layer, and the physical layer selects an available resource set based on a parameter obtained from the higher layer and a channel listening status, and reports the available resource set to the higher layer. The higher layer randomly selects a required resource from resources reported by the physical layer and sends the service data.

However, in such a prior-art resource selection method, a transmission delay is relatively great, and service reliability cannot be ensured.

SUMMARY

This application provides a service data transmission method and apparatus, so as to resolve problems in an existing resource selection method that a transmission delay is relatively great, and low-delay and reliability requirements of some low-delay and/or highly-reliable services cannot be satisfied.

A first aspect of this application provides a service data transmission method, including:

obtaining, by a terminal, first configuration information, where the first configuration information includes a first service feature parameter and a first resource parameter corresponding to the first service feature parameter;

obtaining, by the terminal, to-be-sent service data and a second service feature parameter corresponding to the to-be-sent service data;

determining, by the terminal based on the first service feature parameter, the second service feature parameter, and the first resource parameter, a second resource parameter for transmitting the to-be-sent service data;

selecting, by the terminal based on the second resource parameter, an available resource for transmitting the to-be-sent service data; and transmitting, by the terminal, the to-be-sent service data by using the available resource.

In one embodiment, the method further includes:

obtaining, by the terminal, the to-be-sent service data at a first moment.

In one embodiment, the first resource parameter and the second resource parameter each include a first time parameter or a value range parameter of a first time parameter.

In one embodiment, the value range parameter of the first time parameter includes a lower limit of a value range of the first time parameter and/or an upper limit of a value range of the first time parameter.

In one embodiment, the determining, by the terminal based on the first service feature parameter, the second service feature parameter, and the first resource parameter, a second resource parameter for transmitting the to-be-sent service data includes:

when the second service feature parameter is the first service feature parameter, determining, by the terminal, that the second resource parameter is the first resource parameter.

In one embodiment, when the first resource parameter and the second resource parameter each include the value range parameter of the first time parameter, the selecting, by the terminal based on the second resource parameter, an available resource for transmitting the to-be-sent service data includes:

determining, by the terminal, a value of the first time parameter based on the second resource parameter; and selecting, by the terminal based on the value of the first time parameter, the available resource for transmitting the to-be-sent service data.

In one embodiment, the selecting, by the terminal based on the second resource parameter, an available resource for transmitting the to-be-sent service data includes:

selecting, by the terminal from a transmission resource pool based on the second resource parameter, the available resource for transmitting the to-be-sent service data.

In one embodiment, the first service feature parameter and the second service feature parameter each include one or more of a proximity service per-packet priority, a destination identifier, and a channel busy ratio.

In one embodiment, the obtaining, by a terminal, first configuration information includes:

reading, by the terminal, the first configuration information prestored in the terminal; or receiving, by the terminal, the first configuration information sent by a network device.

In one embodiment, the receiving, by the terminal, the first configuration information sent by a network device includes:

receiving, by the terminal, a system message that is broadcast by the network device, where the system message includes the first configuration information; or receiving, by the terminal, dedicated signaling that is sent by the network device, where the dedicated signaling includes the first configuration information.

In one embodiment, the first resource parameter and the second resource parameter may further include a second time parameter or a value range parameter of a second time parameter.

In one embodiment, when the first resource parameter and the second resource parameter include the value range parameter of the second time parameter, the value range parameter of the second time parameter includes:

a lower limit of a value range of the second time parameter and/or an upper limit of a value range of the second time parameter.

In one embodiment, the first resource parameter and the second resource parameter each include:

the first time parameter and the second time parameter; or the value range parameter of the first time parameter and the value range parameter of the second time parameter; or the first time parameter and the value range parameter of the second time parameter; or the value range parameter of the first time parameter and the second time parameter.

In one embodiment, the value range parameter of the first time parameter includes a lower limit of a value range of the first time parameter and/or an upper limit of a value range of the first time parameter; and the value range parameter of the second time parameter includes a lower limit of a value range of the second time parameter and/or an upper limit of a value range of the second time parameter.

A second aspect of this application provides a resource selection apparatus for service data transmission, including:

an obtaining module, configured to: obtain first configuration information, where the first configuration information includes a first service feature parameter and a first resource parameter corresponding to the first service feature parameter; and obtain to-be-sent service data and a second service feature parameter corresponding to the to-be-sent service data;

a determining module, configured to determine, based on the first service feature parameter, the second service feature parameter, and the first resource parameter, a second resource parameter for transmitting the to-be-sent service data;

a selection module, configured to select, based on the second resource parameter, an available resource for transmitting the to-be-sent service data; and a transmission module, configured to transmit the to-be-sent service data by using the available resource.

In one embodiment, the obtaining module is further configured to obtain the to-be-sent service data at a first moment.

In one embodiment, the first resource parameter and the second resource parameter each include a first time parameter or a value range parameter of a first time parameter.

In one embodiment, the value range parameter of the first time parameter includes a lower limit of a value range of the first time parameter and/or an upper limit of a value range of the first time parameter.

In one embodiment, the determining module is specifically configured to: when the second service feature parameter is the first service feature parameter, determine that the second resource parameter is the first resource parameter.

In one embodiment, the selection module is specifically configured to: when the first resource parameter and the second resource parameter each include the value range parameter of the first time parameter, determine a value of the first time parameter based on the second resource parameter, and select, based on the value of the first time parameter, the available resource for transmitting the to-be-sent service data.

In one embodiment, the selection module is specifically configured to: select, from a transmission resource pool based on the second resource parameter, the available resource for transmitting the to-be-sent service data.

In one embodiment, the first service feature parameter and the second service feature parameter each include one or more of a proximity service per-packet priority, a destination identifier, and a channel busy ratio.

In one embodiment, the obtaining module is specifically configured to read the first configuration information prestored in the terminal, or receive the first configuration information sent by a network device.

In one embodiment, the obtaining module receives a system message that is broadcast by the network device, where the system message includes the first configuration information; or receives dedicated signaling that is sent by a network device, where the dedicated signaling includes the first configuration information.

In one embodiment, the first resource parameter and the second resource parameter may further include a second time parameter or a value range parameter of a second time parameter.

When the first resource parameter and the second resource parameter include the value range parameter of the second time parameter, the value range parameter of the second time parameter includes a lower limit of a value range of the second time parameter and/or an upper limit of a value range of the second time parameter.

In one embodiment, the first resource parameter and the second resource parameter each include:

the first time parameter and the second time parameter; or the value range parameter of the first time parameter and the value range parameter of the second time parameter; or the first time parameter and the value range parameter of the second time parameter; or the value range parameter of the first time parameter and the second time parameter.

The value range parameter of the first time parameter includes a lower limit of a value range of the first time parameter and/or an upper limit of a value range of the first time parameter, and the value range parameter of the second time parameter includes a lower limit of a value range of the second time parameter and/or an upper limit of a value range of the second time parameter.

A third aspect of this application provides a resource selection apparatus for service data transmission, where the apparatus includes one or more processors and a memory, the memory is configured to store a program, and the one or more processors invokes the program stored in the memory, to perform the method provided in the first aspect of this application.

A fourth aspect of this application provides a resource selection apparatus for service data transmission, including at least one processing element (or chip) configured to perform the foregoing method in the first aspect.

A fifth aspect of this application provides a program, and when executed by one or more processors, the program is configured to perform the foregoing method in the first aspect.

A sixth aspect of this application provides a program product, such as a computer readable storage medium, and the program product includes the program in the seventeenth aspect.

In the service data transmission method and apparatus provided in this application, the terminal obtains the first configuration information, and the first configuration information includes the first service feature parameter and the first resource parameter corresponding to the first service feature parameter. Then, the terminal obtains the to-be-sent service data and the second service feature parameter corresponding to the to-be-sent service data, and determines, based on the first service feature parameter, the second service feature parameter, and the first resource parameter, the second resource parameter required for transmitting the to-be-sent service data. The terminal selects, based on the second resource parameter, the available resource for transmitting the to-be-sent service data, and transmits the to-be-sent service data by using the available resource. In this way, the service feature parameter of the service data is considered while the available resource is determined, to determine the resource parameter based on the service feature parameter, thereby better satisfying a delay requirement of a low-delay service.

DESCRIPTION OF EMBODIMENTS

Figure 1:
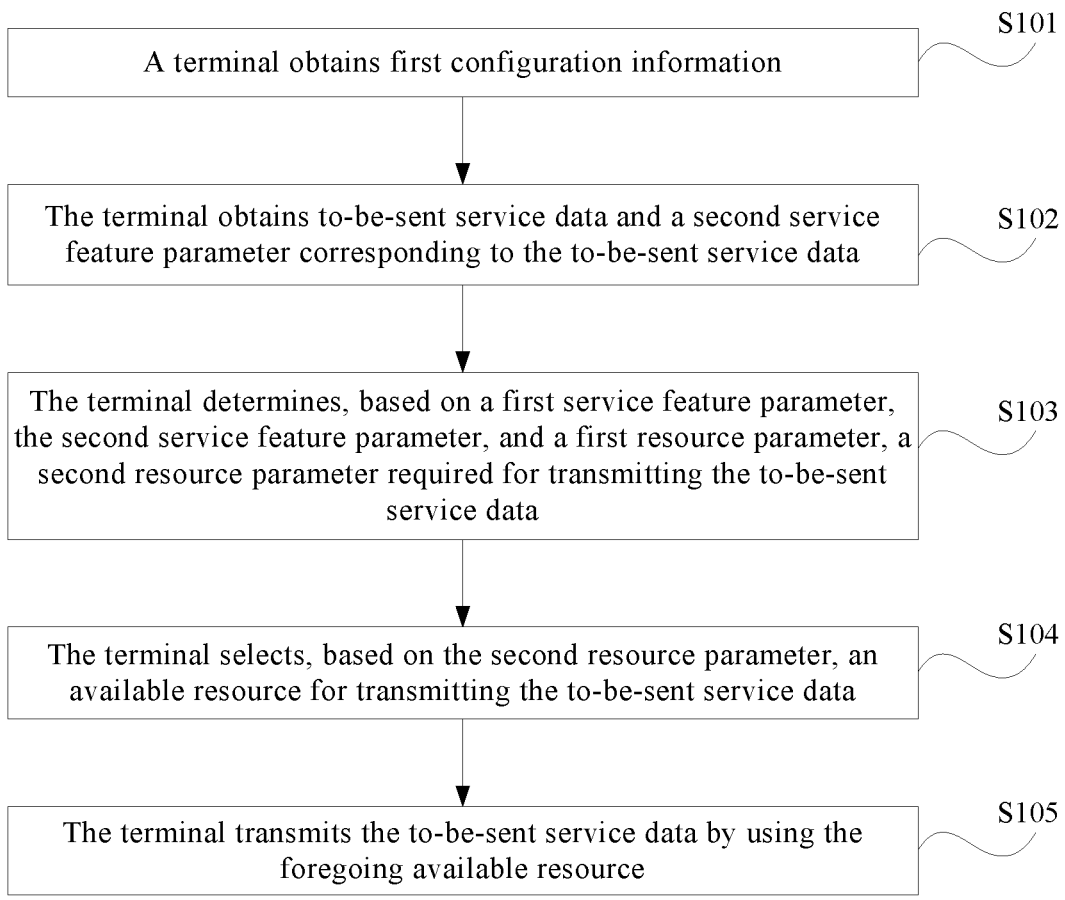
FIG. 1 is a schematic flowchart of a service data transmission method according to an embodiment of this application.

The following explains and describes some terms in the embodiments of this application for ease of understanding by a person skilled in the art.

Base station: is also referred to as a radio access network (RAN) device, and is a radio transceiver device that performs information transmission with a terminal device by using a mobile communications switching center within specific radio coverage. The base station may be a base transceiver station (BTS) in a Global System for Mobile Communications (GSM) or in Code Division Multiple Access (CDMA), or may be a NodeB (NB) in Wideband Code Division Multiple Access (WCDMA), or may be an evolved NodeB (eNB or eNodeB) in Long Term Evolution (LTE), or a relay station or an access point, or a base station in a future 5G network, or the like. This is not limited herein.

Terminal: is a terminal or an in-vehicle device in V2X communication, or a mobile phone or a tablet having a V2X communication function, or the like. This is not limited in this application.

In the embodiments of the present invention, the term "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In existing V2X communication, a mode 4 transmission resource selection manner of LTE is used to select a transmission resource to transmit service data. A specific process includes: When employing the mode 4 transmission resource selection manner, a terminal performs listening and measurement in a corresponding resource pool, and reserves, based on a listening result in latest 1000 milliseconds (ms), a resource for subsequent service data transmission. When the terminal needs to send service data, a physical layer reports a resource reserved after the listening to a higher layer when service data of the higher layer arrives at the physical layer, and the higher layer selects a required transmission resource from the foregoing reserved resource, and performs service transmission by using the required transmission resource. Specifically, when the service data of the higher layer arrives at the physical layer in a subframe n, the physical layer selects a candidate resource from a time-frequency resource corresponding to a time interval [n+T1, n+T2] and reports the candidate resource to the higher layer, and the higher layer selects the required resource from the candidate resource to perform service transmission. Time resource parameters T1 and T2 meet: $T1 \leq 4$ ms and $20$ ms $\leq T2 \leq 100$ ms, where selection of a value of T2 may ensure that a greatest delay is not greater than 20 ms. However, a current service requirement is to achieve a smaller delay such as 10 ms, and the requirement cannot be satisfied due to existing restrictions of T1 and T2.

In addition, it is currently stipulated that values of T1 and T2 are determined by a terminal on the basis of satisfying the foregoing constrain conditions. This may cause the following cases: A terminal may select a smaller value of T2 in an implementation to reduce its own service delay. For example, when there is a highest-priority service with a delay requirement for 50 ms, a terminal selects a value that is close to 20 ms for T2 (for example, 20 ms), resulting in resource preemption between a low-priority service and a high-priority service. As a result, for the high-priority service, a conflict is intensified, and the delay is increased, and especially reliability cannot be ensured.

In the embodiments of this application, a time parameter is flexibly considered based on a service feature of a specific service that needs to be transmitted, to satisfy a requirement for a smaller delay.

FIG. 1 is a schematic flowchart of a service data transmission method according to an embodiment of this application. As shown in FIG. 1, the method includes the following operations.

Operation S101. A terminal obtains first configuration information, where the first configuration information includes at least a first service feature parameter, and a first resource parameter corresponding to the first service feature parameter.

The first configuration information is used to indicate a mapping relationship between a service feature parameter and a resource parameter, so that when needing to send service data, the terminal determines a resource parameter in consideration of a service feature parameter of service data.

It should be noted that the first service feature parameter and the first resource parameter herein are described as an example, and the first configuration information may include a plurality of groups of service feature parameters and resource parameters corresponding to the groups of service feature parameters.

Operation S102. The terminal obtains to-be-sent service data and a second service feature parameter corresponding to the to-be-sent service data.

The second service feature parameter is a service feature parameter of the to-be-sent service data, and is used to indicate a service feature of the to-be-sent service data.

In one embodiment, the second service feature parameter may be included in the foregoing first configuration information, or may not be included in the first configuration information. This is not limited herein.

Operation S103. The terminal determines, based on a first service feature parameter, the second service feature parameter, and a first resource parameter, a second resource parameter required for transmitting the to-be-sent service data.

In other words, after learning of the first service feature parameter, the second service feature parameter, and the first resource parameter, the terminal determines the second resource parameter corresponding to the service feature parameter of the to-be-sent service data.

In one embodiment, if the second service feature parameter is not included in the first configuration information, the terminal may temporarily request a base station to configure the second resource parameter corresponding to the second service feature parameter.

Operation S104. The terminal selects, based on the second resource parameter, an available resource for transmitting the to-be-sent service data.

Operation S105. The terminal transmits the to-be-sent service data by using the available resource.

In this embodiment, the terminal obtains the first configuration information, and the first configuration information includes the first service feature parameter and the first resource parameter corresponding to the first service feature parameter. Then, the terminal obtains the to-be-sent service data and the second service feature parameter corresponding to the to-be-sent service data, and determines, based on the first service feature parameter, the second service feature parameter, and the first resource parameter, the second resource parameter required for transmitting the to-be-sent service data. The terminal selects, based on the second resource parameter, the available resource for transmitting the to-be-sent service data, and transmits the to-be-sent service data by using the available resource. In this way, the service feature parameter of the service data is considered while the available resource is determined, to determine the resource parameter based on the service feature parameter, thereby better satisfying a delay requirement of a low-delay service.

It should be noted that if a plurality of pieces of service data need to be transmitted, the to-be-sent service data may be highest-priority service data in the plurality of pieces of service data.

In one embodiment, on the basis of the foregoing embodiment, the terminal obtains the to-be-sent data at a first moment subframe n.

The to-be-sent data may be specifically obtained by an upper layer of a physical layer of the terminal, and the upper layer may be an application layer, an adaptation layer, a non-access stratum (NAS), or an upper-layer protocol layer of an access stratum of the terminal. The upper-layer protocol layer of the access stratum is, for example, a Packet Data Convergence Protocol (PDCP) layer, a radio link control (RLC) layer, or a Media Access Control (MAC) layer. This is not specifically limited herein.

Generally, two resource parameters T1 and T2 are used to determine the available resource for the to-be-sent service data. To be specific, the available resource is obtained based on a PSSCH resource pool corresponding to a time window [n+T1, n+T2], and T2 has greater impact on a delay.

The first resource parameter and the second resource parameter each include a first time parameter T2, or a value range parameter of a first time parameter. The first resource parameter corresponding to the first service feature parameter is the first time parameter T2 corresponding to the first service feature parameter, or the value range parameter of the first time parameter corresponding to the first service feature parameter. The second resource parameter corresponding to the second service feature parameter is the first time parameter T2 corresponding to the second service feature parameter, or the value range parameter of the first time parameter corresponding to the first service feature parameter.

The value range parameter of the first time parameter may include a lower limit T2min of a value range of the first time parameter and/or an upper limit T2max of a value range of the first time parameter.

Specifically, if T2 is determined based on the first service feature parameter, the second service feature parameter, and the first resource parameter, T1 may be a preset value. Similarly, if a value range of T2 is determined based on the first service feature parameter, the second service feature parameter, and the first resource parameter, T1 may be a preset value.

More specifically, if determining the value range of T2 based on the first service feature parameter, the second service feature parameter and the first resource parameter is determining a lower limit T2min of the value range of T2, T1 and an upper limit T2max of the value range of T2 may be preset values. Similarly, if determining the value range of T2 based on the first service feature parameter, the second service feature parameter, and the first resource parameter is determining an upper limit T2max of the value range of T2, T1 and a lower limit T2min of the value range of T2 may be preset values.

If the first configuration information includes a resource parameter corresponding to the second service feature parameter, using that the second service feature parameter is the first service feature parameter as an example, the determining, by the terminal based on a first service feature parameter, the second service feature parameter, and a first resource parameter, a second resource parameter required for transmitting the to-be-sent service data may be determining, by the terminal, that the second resource parameter is the first resource parameter. In other words, the second resource parameter corresponding to the second service feature parameter is determined directly based on the first configuration information.

In one embodiment, when the first resource parameter and the second resource parameter each include the value range parameter of the first time parameter, the selecting, by the terminal based on the second resource parameter, an available resource for transmitting the to-be-sent service data is specifically: determining, by the terminal, a value of the first time parameter T2 based on the second resource parameter, and then selecting, by the terminal based on the value of the first time parameter T2, the available resource for transmitting the to-be-sent service data.

To be specific, if the value range parameter of the first time parameter T2 is determined based on the service feature parameter, the value of T2 needs to be further determined, and then the available resource for transmitting the to-be-sent service data is selected based on the value of T2. Specifically, the value of T2 may be further determined according to a preset rule, or the value of T2 may be randomly determined within the value range of T2. This is not limited in this embodiment.

In one embodiment, the first resource parameter and the second resource parameter each include a second time parameter T1, or a value range parameter of a second time parameter T1.

The first resource parameter corresponding to the first service feature parameter is the second time parameter T1 corresponding to the first service feature parameter, or the value range parameter of the second time parameter corresponding to the first service feature parameter. The second resource parameter corresponding to the second service feature parameter is the second time parameter T1 corresponding to the second service feature parameter, or the value range parameter of the second time parameter corresponding to the second service feature parameter.

Similarly, when the first resource parameter and the second resource parameter each include the value range parameter of the second time parameter T1, the value range parameter of the second time parameter includes a lower limit T1min of a value range of the second time parameter and/or an upper limit T1max of a value range of the second time parameter.

In one embodiment, when the first resource parameter and the second resource parameter each include the value range parameter of the second time parameter, the selecting, by the terminal based on the second resource parameter, an available resource for transmitting the to-be-sent service data is specifically: determining, by the terminal, a value of the second time parameter T1 based on the second resource parameter, and then selecting, by the terminal based on the value of the second time parameter T1, the available resource for transmitting the to-be-sent service data.

In one implementation, the first resource parameter and the second resource parameter each include the first time parameter T2 and the second time parameter T1, or the value range parameter of the first time parameter and the value range parameter of the second time parameter, or the first time parameter and the value range parameter of the second time parameter, or the value range parameter of the first time parameter and the second time parameter.

In this manner, both T1 and T2 are determined based on the first configuration information.

If the first resource parameter and the second resource parameter each include the first time parameter T2 and the second time parameter T1, the terminal may directly determine T1 and T2 based on the first service feature parameter, the second service feature parameter, and the first resource parameter. If the first resource parameter and the second resource parameter each include the value range parameter of the first time parameter and the value range parameter of the second time parameter, the terminal needs to further determine T2 based on the value range parameter of the first time parameter, and determine T1 based on the value range parameter of the second time parameter.

Likewise, if the first resource parameter and the second resource parameter each include the first time parameter and the value range parameter of the second time parameter, the terminal needs to further determine T1 based on the value range parameter of the second time parameter. If the first resource parameter and the second resource parameter each include the value range parameter of the first time parameter and the second time parameter, the terminal needs to further determine T2 based on the value range parameter of the first time parameter.

Similarly, the value range parameter of the first time parameter may include a lower limit T2min of a value range of the first time parameter and/or an upper limit T2max of a value range of the first time parameter. The value range parameter of the second time parameter includes a lower limit T1min of a value range of the second time parameter and/or an upper limit T1max of a value range of the second time parameter.

Further, the selecting, by the terminal based on the second resource parameter, an available resource for transmitting the to-be-sent service data may be: selecting, by the terminal from a transmission resource pool based on the second resource parameter, the available resource for transmitting the to-be-sent service data.

In one embodiment, after values of T1 and T2 are determined, a physical sidelink shared channel (PSSCH) resource pool corresponding to [n+T1, n+T2] may be further determined, and a resource that meets a preset condition is selected from the PSSCH resource pool as the available resource. However, the resource pool is not limited to the PSSCH resource pool, and a corresponding resource pool may be determined based on specific application.

On the basis of the foregoing embodiment, the first service feature parameter and the second service feature parameter each include one or more of a proximity service per-packet priority (ProSe Per-Packet Priority or PPPP), a destination identifier (Destination ID), and a channel busy ratio (CBR). In other words, the service feature parameter mentioned in this embodiment of this application may be any combination of the PPPP, the Destination ID, and the CBR. A mapping relationship between the service feature parameter and the resource parameter may be a mapping relationship between this combination and a resource parameter. For example, if the first service feature parameter includes [PPPP, Destination ID], the first resource parameter corresponding to the first service feature parameter is the first resource parameter corresponding to [PPPP, Destination ID]. For example, if the first resource parameter includes the first time parameter T2 and the second time parameter T1, the first configuration information may include [PPPP, Destination ID] and "a first time parameter T2 and a second time parameter T1" corresponding to [PPPP, Destination ID].

The destination ID is a field in a frame structure of a MAC protocol data unit (PDU), the field indicates a specific service type, and different service types have different destination IDs.

The resource parameters corresponding to the service feature parameters are determined based on these service feature parameters, so that it can be ensured that a delay requirement of a high-priority service is satisfied, a low-priority service is prevented from preempting a resource of a high-priority service, and a reliability requirement of the high-priority service is satisfied.

Furthermore, that a terminal obtains first configuration information may be: the terminal reads the first configuration information prestored in the terminal. In this manner, the first configuration information may be preset in the terminal when the terminal is delivered.

In another manner, that a terminal obtains first configuration information may be: the terminal receives the first configuration information sent by a network device. In one embodiment, the terminal may receive system information that is broadcast by the network device, where the system information carries the first configuration information, or the terminal receives dedicated signaling that is sent by the network device, where the dedicated signaling includes the first configuration information.

The system information may be a System Information Block (SIB), for example, a SIB 1, a SIB 2, . . . , or a SIB 21, and the dedicated signaling may be radio resource control (RRC) dedicated signaling. However, this application is not limited thereto.

Figure 2:
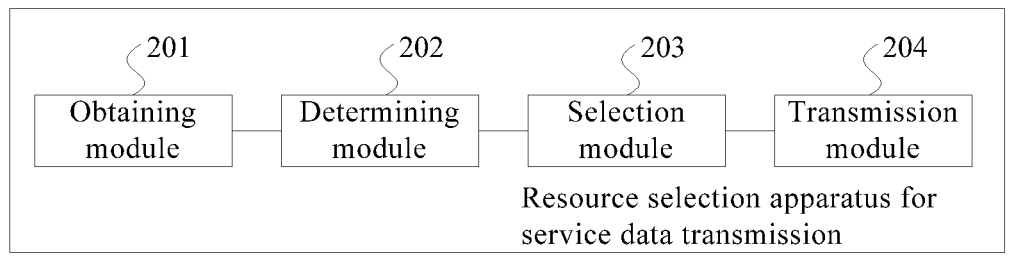
FIG. 2 is a schematic structural diagram of a resource selection apparatus for service data transmission according to an embodiment of this application.

FIG. 2 is a schematic structural diagram of a resource selection apparatus for service data transmission according to an embodiment of this application, and the apparatus may be integrated into a terminal. As shown in FIG. 2, the apparatus includes an obtaining module 201, a determining module 202, a selection module 203, and a transmission module 204.

The obtaining module 201 is configured to: obtain first configuration information, where the first configuration information includes a first service feature parameter, and a first resource parameter corresponding to the first service feature parameter; and obtain to-be-sent service data and a second service feature parameter corresponding to the to-be-sent service data.

The determining module 202 is configured to determine, based on the first service feature parameter, the second service feature parameter, and the first resource parameter, a second resource parameter for transmitting the to-be-sent service data.

The selection module 203 is configured to select, based on the second resource parameter, an available resource for transmitting the to-be-sent service data.

The transmission module 204 is configured to transmit the to-be-sent service data by using the available resource.

Further, the obtaining module 201 is further configured to obtain the to-be-sent service data at a first moment.

In one embodiment, the first resource parameter and the second resource parameter each include a first time parameter or a value range parameter of a first time parameter.

In one embodiment, the value range parameter of the first time parameter includes a lower limit of a value range of the first time parameter and/or an upper limit of a value range of the first time parameter.

Further, the determining module 202 is specifically configured to: when the second service feature parameter is the first service feature parameter, determine that the second resource parameter is the first resource parameter.

In an implementation, the selection module 203 is specifically configured to: when the first resource parameter and the second resource parameter each include the value range parameter of the first time parameter, determine a value of the first time parameter based on the second resource parameter, and select, based on the value of the first time parameter, the available resource for transmitting the to-be-sent service data.

On the basis of the foregoing embodiment, the selection module 203 is specifically configured to select, from a transmission resource pool based on the second resource parameter, the available resource for transmitting the to-be-sent service data.

In one embodiment, the first service feature parameter and the second service feature parameter each include one or more of a proximity service per-packet priority, a destination identifier, and a channel busy ratio.

The obtaining module 201 is specifically configured to read the first configuration information prestored in the terminal, or receive the first configuration information sent by a network device.

More specifically, the obtaining module 201 receives a system message broadcasted by the network device, where the system message includes the first configuration information; or receives dedicated signaling that is sent by the network device, where the dedicated signaling includes the first configuration information.

In one embodiment, the first resource parameter and the second resource parameter may further include a second time parameter or a value range parameter of a second time parameter.

When the first resource parameter and the second resource parameter include the value range parameter of the second time parameter, the value range parameter of the second time parameter includes:

a lower limit of a value range of the second time parameter and/or an upper limit of a value range of the second time parameter.

In addition, in an optional solution, the first resource parameter and the second resource parameter each include:

the first time parameter and the second time parameter; or the value range parameter of the first time parameter and the value range parameter of the second time parameter; or the first time parameter and the value range parameter of the second time parameter; or the value range parameter of the first time parameter and the second time parameter.

The value range parameter of the first time parameter includes a lower limit of a value range of the first time parameter and/or an upper limit of a value range of the first time parameter. The value range parameter of the second time parameter includes a lower limit of a value range of the second time parameter and/or an upper limit of a value range of the second time parameter.

The foregoing apparatus may be configured to perform the method provided in the foregoing method embodiment. Specific implementations and technical effects are similar, and details are not described herein again.

It should be noted that, division of the modules of the foregoing apparatus is merely division of logical functions, and during actual implementation, all or some of the modules may be integrated into a physical entity, or may be physically separated. In addition, these modules may be all implemented in a form of a processing element invoking software, or may be all implemented in a form of hardware, or some modules may be implemented in a form of a processing element invoking software and some modules may be implemented in a form of hardware. For example, the determining module may be a separately disposed processing element, or may be integrated into a chip of the foregoing apparatus. Alternatively, the determining module may be stored in a memory of the foregoing apparatus in a form of program code and invoked by a processing element of the foregoing apparatus to perform a function of the determining module. Other modules are implemented in a similar manner. In addition, these modules may be all or partly integrated, or independently implemented. The processing element herein may be an integrated circuit with a signal processing capability. In an implementation process, operations of the foregoing method or the foregoing modules may be implemented by using a hardware integrated logic circuit in the processor element or an instruction in a form of software.

For example, the foregoing modules may be one or more integrated circuits configured to implement the foregoing method, such as one or more application-specific integrated circuits (ASIC), or one or more microprocessors (DSP), or one or more field programmable gate arrays (FPGA). For another example, when one of the foregoing modules is implemented in a form of a processing element invoking program code, the processing element may be a general purpose processor, for example, a central processing unit (CPU) or another processor that can invoke the program code. For another example, these modules may be integrated, and implemented in a system-on-a-chip (SOC) form.

Figure 3:
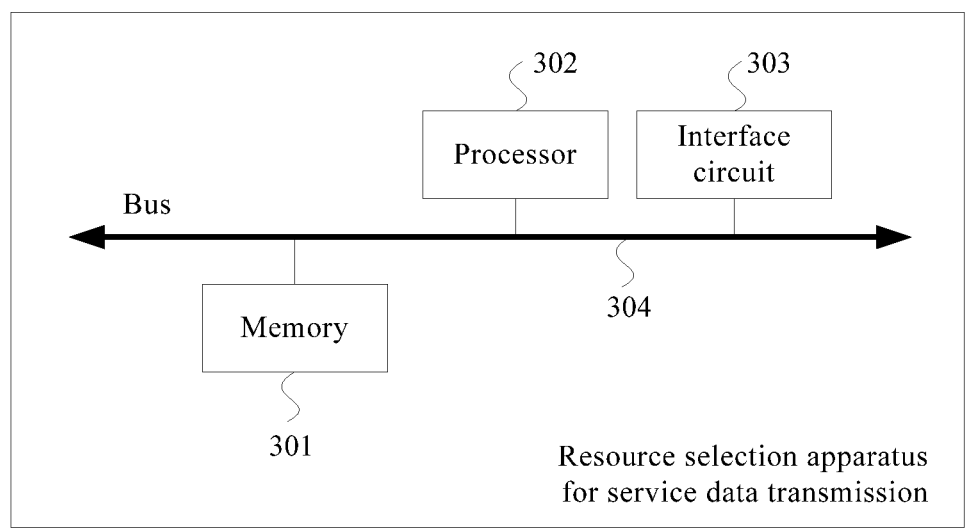
FIG. 3 is a schematic structural diagram of a resource selection apparatus for service data transmission according to another embodiment of this application.

FIG. 3 is a schematic structural diagram of a resource selection apparatus for service data transmission according to another embodiment of this application, and the apparatus may be integrated into a terminal. As shown in FIG. 3, the apparatus includes: a memory 301, a processor 302, an interface circuit 303, and a bus 304.

The memory 301, the processor 302, and the interface circuit 303 are connected and communicate with each other by using the bus 304. The processor 302 receives or sends information such as control information and data by using the interface circuit 303.

The memory 301 stores a set of program code, and the processor 302 invokes the program code stored in the memory 301, to perform the following operations:

obtaining first configuration information, where the first configuration information includes a first service feature parameter and a first resource parameter corresponding to the first service feature parameter;

obtaining to-be-sent service data and a second service feature parameter corresponding to the to-be-sent service data;

determining, based on the first service feature parameter, the second service feature parameter, and the first resource parameter, a second resource parameter for transmitting the to-be-sent service data;

selecting, based on the second resource parameter, an available resource for transmitting the to-be-sent service data; and transmitting the to-be-sent service data by using the available resource.

In this embodiment, the terminal obtains the first configuration information, and the first configuration information includes the first service feature parameter and the first resource parameter corresponding to the first service feature parameter. Then, the terminal obtains the to-be-sent service data and the second service feature parameter corresponding to the to-be-sent service data, and determines, based on the first service feature parameter, the second service feature parameter, and the first resource parameter, the second resource parameter required for transmitting the to-be-sent service data. The terminal selects, based on the second resource parameter, the available resource for transmitting the to-be-sent service data, and transmits the to-be-sent service data by using the available resource. In this way, the service feature parameter of the service data is considered while the available resource is determined, to determine the resource parameter based on the service feature parameter, thereby better satisfying a delay requirement of a low-delay service.

In one embodiment, the processor 302 is further configured to obtain the to-be-sent service data at a first moment.

In an implementation, the first resource parameter and the second resource parameter each include a first time parameter or a value range parameter of a first time parameter.

The value range parameter of the first time parameter includes a lower limit of a value range of the first time parameter and/or an upper limit of a value range of the first time parameter.

In one embodiment, the processor 302 is specifically configured to: when the second service feature parameter is the first service feature parameter, determine that the second resource parameter is the first resource parameter.

When the first resource parameter and the second resource parameter each include the value range parameter of the first time parameter, the processor 302 is specifically configured to determine a value of the first time parameter based on the second resource parameter, and select, based on the value of the first time parameter, the available resource for transmitting the to-be-sent service data.

In one embodiment, the processor 302 is specifically configured to select, from a transmission resource pool based on the second resource parameter, the available resource for transmitting the to-be-sent service data.

In one embodiment, the first service feature parameter and the second service feature parameter each include one or more of a proximity service per-packet priority, a destination identifier, and a channel busy ratio.

Further, the processor 302 is specifically configured to read the first configuration information prestored in the terminal, or receive the first configuration information sent by a network device.

Furthermore, the processor 302 is specifically configured to receive a system message that is broadcast by the network device, where the system message includes the first configuration information; or receive dedicated signaling sent by the network device, where the dedicated signaling includes the first configuration information.

In one embodiment, the first resource parameter and the second resource parameter may further include a second time parameter or a value range parameter of a second time parameter.

In one embodiment, when the first resource parameter and the second resource parameter include the value range parameter of the second time parameter, the value range parameter of the second time parameter includes a lower limit of a value range of the second time parameter and/or an upper limit of a value range of the second time parameter.

In one embodiment, the first resource parameter and the second resource parameter each include:

the first time parameter and the second time parameter; or the value range parameter of the first time parameter and the value range parameter of the second time parameter; or the first time parameter and the value range parameter of the second time parameter; or the value range parameter of the first time parameter and the second time parameter.

Further, the value range parameter of the first time parameter includes a lower limit of a value range of the first time parameter and/or an upper limit of a value range of the first time parameter.

The value range parameter of the second time parameter includes a lower limit of a value range of the second time parameter and/or an upper limit of a value range of the second time parameter.

The apparatus is configured to perform the foregoing method embodiment. Implementation principles and technical effects are similar, and details are not described herein again.

On the basis of the foregoing embodiment, this application may further provide a computer readable storage medium, where the computer readable storage medium stores a program, and the program is configured to perform the foregoing method when executed by a processor. For the implementation principles and technical effects, refer to the foregoing embodiment.

What is claimed is:

1. A resource selection method for service data transmission, comprising:
   obtaining, by a terminal, first configuration information, wherein the first configuration information comprises a first service feature parameter and a first resource parameter corresponding to the first service feature parameter;
   obtaining, by the terminal, to-be-sent service data and a second service feature parameter corresponding to the to-be-sent service data;
   determining, by the terminal based on the first service feature parameter, the second service feature parameter, and the first resource parameter, a second resource parameter for transmitting the to-be-sent service data;
   selecting, by the terminal based on the second resource parameter, an available resource for transmitting the to-be-sent service data; and
   transmitting, by the terminal, the to-be-sent service data by using the available resource.

2. The method according to claim 1, further comprising:
   obtaining, by the terminal, the to-be-sent service data at a first moment.

3. The method according to claim 1, wherein the first resource parameter and the second resource parameter each comprise a first time parameter or a value range parameter of the first time parameter.

4. The method according to claim 3, wherein the value range parameter of the first time parameter comprises a lower limit of a value range of the first time parameter and/or an upper limit of the value range of the first time parameter.

5. The method according to claim 1, wherein the determining, by the terminal based on the first service feature parameter, the second service feature parameter, and the first resource parameter, a second resource parameter for transmitting the to-be-sent service data comprises:
   when the second service feature parameter is the first service feature parameter, determining, by the terminal, that the second resource parameter is the first resource parameter.

6. The method according to claim 3, wherein when the first resource parameter and the second resource parameter each comprises the value range parameter of the first time parameter, the selecting, by the terminal based on the second resource parameter, an available resource for transmitting the to-be-sent service data comprises:
   determining, by the terminal, a value of the first time parameter based on the second resource parameter; and
   selecting, by the terminal based on the value of the first time parameter, the available resource for transmitting the to-be-sent service data.

7. The method according to claim 1, wherein the selecting, by the terminal based on the second resource parameter, an available resource for transmitting the to-be-sent service data comprises:
   selecting, by the terminal from a transmission resource pool based on the second resource parameter, the available resource for transmitting the to-be-sent service data.

8. The method according to claim 1, wherein the first service feature parameter and the second service feature parameter each comprise one or more of a proximity service per-packet priority, a destination identifier, and a channel busy ratio.

9. The method according to claim 1, wherein the obtaining, by a terminal, first configuration information comprises:
   reading, by the terminal, the first configuration information prestored in the terminal; or
   receiving, by the terminal, the first configuration information sent by a network device.

10. The method according to claim 9, wherein the receiving, by the terminal, the first configuration information sent by a network device comprises:
    receiving, by the terminal, a system message broadcast by the network device, wherein the system message comprises the first configuration information; or
    receiving, by the terminal, dedicated signaling sent by the network device, wherein the dedicated signaling comprises the first configuration information.

11. The method according to claim 1, wherein the first resource parameter and the second resource parameter further comprise a second time parameter or a value range parameter of the second time parameter.

12. The method according to claim 11, wherein when the first resource parameter and the second resource parameter comprise the value range parameter of the second time parameter, the value range parameter of the second time parameter comprises:
    a lower limit of a value range of the second time parameter and/or an upper limit of the value range of the second time parameter.

13. The method according to claim 11, wherein the first resource parameter and the second resource parameter each comprise:
    a first time parameter and the second time parameter; or
    a value range parameter of the first time parameter and the value range parameter of the second time parameter; or
    the first time parameter and the value range parameter of the second time parameter; or
    the value range parameter of the first time parameter and the second time parameter.

14. The method according to claim 13, wherein the value range parameter of the first time parameter comprises a lower limit of a value range of the first time parameter and/or an upper limit of the value range of the first time parameter; and
    the value range parameter of the second time parameter comprises a lower limit of a value range of the second time parameter and/or an upper limit of the value range of the second time parameter.

15. A resource selection apparatus for service data transmission, comprising:
    a processor, configured to:
    obtain first configuration information, wherein the first configuration information comprises a first service feature parameter and a first resource parameter corresponding to the first service feature parameter; and
    obtain to-be-sent service data and a second service feature parameter corresponding to the to-be-sent service data;
    determine, based on the first service feature parameter, the second service feature parameter, and the first resource parameter, a second resource parameter for transmitting the to-be-sent service data; and
    select, based on the second resource parameter, an available resource for transmitting the to-be-sent service data; and transmitter, configured to transmit the to-be-sent service data by using the available resource.

16. The apparatus according to claim 15, wherein the processor is further configured to obtain the to-be-sent service data at a first moment.

17. The apparatus according to claim 15, wherein the first resource parameter and the second resource parameter each comprise a first time parameter or a value range parameter of the first time parameter.

18. The apparatus according to claim 17, wherein the value range parameter of the first time parameter comprises a lower limit of a value range of the first time parameter and/or an upper limit of the value range of the first time parameter.

19. The apparatus according to claim 15, wherein the processor is configured to: when the second service feature parameter is the first service feature parameter, determine that the second resource parameter is the first resource parameter.

20. A non-transitory computer readable storage medium having instructions stored therein, which when executed by one or more processors, cause the one or more processors to perform operations comprising:
 obtaining, by a terminal, first configuration information, wherein the first configuration information comprises a first service feature parameter and a first resource parameter corresponding to the first service feature parameter;
 obtaining, by the terminal, to-be-sent service data and a second service feature parameter corresponding to the to-be-sent service data;
 determining, by the terminal based on the first service feature parameter, the second service feature parameter, and the first resource parameter, a second resource parameter for transmitting the to-be-sent service data;
 selecting, by the terminal based on the second resource parameter, an available resource for transmitting the to-be-sent service data; and
 transmitting, by the terminal, the to-be-sent service data by using the available resource.

* * * * *